UNITED STATES PATENT OFFICE.

EDWARD HART, OF EASTON, PENNSYLVANIA.

TREATMENT OF GREENSAND, MARL, AND GLAUCONITE.

1,323,228.  Specification of Letters Patent.  Patented Nov. 25, 1919.

No Drawing.   Application filed June 5, 1918.  Serial No. 238,303.

*To all whom it may concern:*

Be it known that I, EDWARD HART, a citizen of the United States, residing at Easton, in the county of Northampton and State of Pennsylvania, have invented certain new and useful Improvements in the Treatment of Greensand, Marl, and Glauconite, of which the following is a full, clear, and exact description.

In the course of extensive study of the mineral commonly known as greensand I have discovered that the sand consists of kernels of opal silica, containing about $8\frac{1}{2}$ per cent. water and coated or incrusted with a layer of marl or glauconite. The latter, I have found, consists in general of fine grains of what appears to be ferroso-ferric oxid ($n\text{FeOFe}_2\text{O}_3 + n\text{H}_2\text{O}$) in which part of the ferrous oxid is replaced by potash, magnesia, and lime, and part of the ferric oxid by alumina. These fine grains are held together by a cement consisting chiefly of ferric phosphate.

My present invention is designed primarily to provide a simple, effective and cheap method of treating the greensand, marl or glauconite to separate the constituents thereof in convenient form for use, and to this end the invention consists in the novel method and procedure hereinafter described.

In the preferred manner of practising my invention the greensand is raised from the deposit by means of a hydraulic elevator, which also washes out the mud. The clean sand is then treated with a suitable chlorinating agent, preferably hydrochloric acid in about 25 per cent. solution. For one ton of sand three tons of acid of 1.12 sp. gr. is ordinarily sufficient. This treatment may be repeated as often as may be necessary to convert (to the desired extent) the above named oxids or some of them into chlorids in solution.

The sand residue is separated from the chlorid solution, washed, and dried. It is now so free from iron, and is such a pure form of silica, that it is especially suitable for the finest kind of glass. For that purpose any small amount of potash remaining undissolved is in general advantageous.

If the chlorid solution produced by the hydrochloric-acid treatment is found to contain ferrous chlorid, as is usually the case, the same should now be oxidized to the ferric salt. This can be effected in any convenient and suitable way, as by adding to the solution a sufficient quantity of chlorin gas, nitric acid, sodium nitrate, or other cheap oxidizing material of suitable character. The solution is next evaporated to dryness, heated to a rather high temperature, say between 300° and 500° C. or thereabout, and steam passed over or through it. By this operation the ferric chlorid is converted into hydrochloric acid and ferric oxid. The aluminum chlorid is attacked at the same time but decomposes more slowly. The magnesium chlorid is also decomposed into acid and oxid, but it is, however, usually present in only very small amount. The other chlorids are not materially effected if at all. The hydrochloric acid thus produced is collected and condensed and may be used over again.

Preferably the amount of chlorids used in the steam treatment is large and the amount of steam used is relatively small, as I find that in this way practically all the hydrochloric acid produced escapes in gaseous form and I am thus able to obtain strong and very pure acid.

The residue left after the steam treatment is now treated with water, which dissolves the soluble chlorids, leaving a residue composed chiefly of ferric oxid. This is carefully washed, and is then suitable for the manufacture of mineral paint or for furnace use in the manufacture of iron. The solution usually contains a relatively small amount of aluminum and calcium chlorids, which may be separated by fractional precipitation. For this purpose a suitable base, for example sodium carbonate, sodium hydroxid, or slaked lime (calcium hydrate), is added to the solution, which may be concentrated if necessary or desirable. The lime (or the sodium carbonate, but preferably the former) converts the aluminum chlorid into hydrated alumina which precipitates and is removed by filtration. It may be used for making aluminum salts or metallic aluminum. The solution remaining, containing calcium and potassium chlorids, may then be treated with sodium carbonate, which converts the calcium chlorid into insoluble carbonate, the latter is filtered out, after which the filtrate is concentrated, preferably by evaporation to dryness, and the solid thus obtained, consisting mostly of potassium chlorid, can be used as fertilizing material without further refining or as crude material for the preparation of pure compounds of potassium. Or the solutions containing the aluminum, calcium and potassium chlorids can be treated with the necessary amount of sodium carbonate, which precipitates the aluminum first (as hydrated alumina). Then more sodium carbonate is added to the solution after the precipitated hydrated alumina is removed, converting the calcium chlorid into carbonate as before. Another way is to concentrate the solution of aluminum, calcium and potassium chlorid solution until the latter chlorid crystallizes, leaving the others in solution in the mother liquor. Upon removing the crystallized salt the remaining chlorids (of aluminum and calsium) can be separated as above.

It is to be understood that the invention is not limited to the specific procedure herein described, as the same can be modified without departing from the spirit of the invention as defined by the following claims.

I claim:—

1. In the treatment of greensand, marl and glauconite, the improvement comprising converting the metal oxids present into chlorids in solution, adding a suitable oxidizing agent to the solution to convert ferrous chlorid into ferric chlorid, evaporating the solution to dryness, heating the solid residue to between 300° and 500° C. approximately and treating the heated material with steam to convert ferric chlorid into oxid with liberation of hydrochloric acid, dissolving out the soluble chlorids remaining, adding calcium hydrate to such solution to precipitate hydrated alumina and removing the latter, adding sodium corbonate to the solution to precipitate calcium carbonate, removing the precipitated calcium carbonate, and concentrating the remaining solution containing potassium.

2. In the treatment of greensand, marl, and glauconite, the improvements comprising treating the material with a chlorinating agent in the presence of water to convert the metal oxids present into chlorids in solution, evaporating the solution to dryness, treating the residue at a high temperature with steam to decompose ferric chlorid and produce hydrochloric acid and an oxid of iron, dissolving out the soluble chlorids remaining, treating the resulting solution with a suitable base to convert aluminum chlorid present into an insoluble compound, and removing the resulting precipitate, treating the remaining solution with a suitable base to convert calcium chlorid present into an insoluble compound and removing the latter from the solution, leaving potassium in soluble form in the solution.

3. In the treatment of greensand, marl and glauconite, the improvement which comprises reacting thereupon with a chloridizing agent capable of converting the metal compounds present into chlorids, separating the insoluble matter from said chlorids, converting the iron present in the chlorid fraction into an oxid, separating the undecomposed chlorids of other metals from the oxid of iron by dissolving out the remaining soluble chlorids, separately precipitating and removing from the said solution, the aluminum and calcium present therein, and concentrating the remaining solution containing potassium compounds.

4. In the treatment of greensand, marl, and glauconite, the improvement comprising converting the metal compounds present into chlorids and producing from such intermediate product a substantially iron-free chlorid solution, adding a suitable base to such solution in such amount to precipitate substantially the entire amount of aluminum as an insoluble compound thereof, and thereafter precipitating substantially all of the calcium content of the solution in an insoluble form, leaving potassium in the solution.

5. In the treatment of greensand, marl, and glauconite, the improvement comprising converting the metal compounds present into chlorids in solid form, subjecting such chlorids at a temperature between about 300° and 500° C. to the action of steam to convert ferric chlorid into an oxid, dissolving out the remaining chlorids, and removing calcium and aluminum from the solution and leaving a potassium compound in solution.

6. In the treatment of greensand, marl, and glauconite, the inprovement comprising converting the metal compounds present into chlorids in a solid form, subjecting such chlorids at a temperature between about 300° and 500° C. to the action of steam to convert ferric chlorid into an oxid, and dissolving out the remaining chlorids.

7. In the treatment of greensand, marl, and glauconite, the improvement comprising converting the metal compounds present into chlorids, treating the chlorids with a suitable re-agent to convert ferrous chlorid into ferric chlorid, treating the chlorids at a suitable temperature with steam to convert ferric chlorid present into hydrochloric acid and an iron oxid, and separating the iron oxid from the remaining undecomposed chlorids.

8. In the treatment of greensand, marl, and glauconite, the improvement which comprises producing a substantially iron-free solution containing the chlorids of the bulk of each of the metals, other than iron, present as compounds in the starting material, adding an alkali to such solution to precipitate an aluminum compound, and removing the latter; adding an alkaline sodium compound capable of precipitating a calcium compound from the remaining solution, and removing the precipitate, leaving a potassium compound in solution.

9. In the treatment of greensand, marl, and glauconite, the improvement comprising so treating the metal compounds present to produce an iron-free solution of chlorids; precipitating separately and removing separately the calcium and aluminum present in the solution; and concentrating the remaining solution containing potassium compounds.

10. In the treatment of greensand, marl, and glauconite, the improvement comprising so treating metal compounds present to produce an iron-free solution of aluminum, calcium and potassium chlorids; treating the solution with slaked lime to precipitate alumina, and removing the same; and treating the remaining solution with an alkali metal carbonate to precipitate calcium carbonate, and removing the same.

11. In the treatment of greensand, marl, and glauconite, the improvement comprising treating the metal compounds present to produce an iron oxid and a solution of metal chlorids, and converting the dissolved aluminum and calcium chlorids successively into insoluble forms and removing the resulting precipitates separately.

12. In the treatment of glauconite material, the step of producing therefrom a substantially iron-free solution containing as soluble compounds, substantially the entire amount of the aluminum and potassium contents of the said glauconite material, and precipitating therefrom a substantially pure aluminum compound and removing such precipitated aluminum compound.

13. A process of treating greensand or the like, which comprises chloridizing the bulk of the metal compounds therein, insolubilizing the iron content of the chloridized material, and separately separating from the soluble product, an aluminum compound and a calcium compound, said two compounds containing the major part at least, of the calcium and aluminum content of the starting material.

14. In the production of potassium salts, the step of separately and successively insolubilizing the iron content, the aluminum content and the calcium content of a liquor containing the chlorids of iron, aluminum, calcium and potassium, and removing such insoluble products whereby a solution containing potassium chlorid results.

15. In the treatment of glauconite material, the steps of converting the metal compounds present therein into chlorids, reconverting the iron into an insoluble condition, and separately removing the aluminum and calcium contents of the soluble product of the above operations, thereby leaving a product containing the potassium content, in a soluble state, of the raw material treated.

In testimony whereof I hereunto affix my signature.

EDWARD HART.